Patented Jan. 30, 1934

1,945,032

UNITED STATES PATENT OFFICE 1,945,032

PRODUCTION OF BENZOIC ACID AND BENZOATES

Jules Emile Demant, Cuise Lamotte, France, assignor to Bozel-Malétra Société Industrielle de Produits Chimiques, Cuise Lamotte, France, a corporation of France No Drawing. Application August 31, 1932, Serial No. 631,126, and in Germany June 23, 1932

6 Claims. (Cl. 260—108)

The invention relates to a process for the production of benzoic acid and benzoates by the oxidation of toluene with the aid of chromates at temperatures above 100° C., for example at 150–300° C. and under pressure, during which the chromic hydroxide formed is separated from the aqueous reaction liquid and the benzoate caused to separate as such or in the form of the free acid. It has been found in this process that the speed of reaction of the toluene oxidation is slowed down by the alkaline reacting products, such as caustic alkali, formed during the oxidation.

It has been found, according to this invention, that in order to neutralize the aforesaid caustic alkali or other alkaline-reacting substances, such agents as bichromates, particularly those of an alkali metal, an alkali earth metal and magnesium, may be employed, for example according to the equations:

$$2C_6H_5CH_3 + 2Na_2Cr_2O_7 =$$
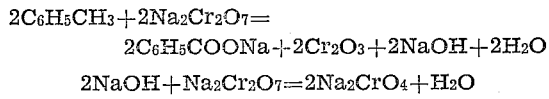
$$2NaOH + Na_2Cr_2O_7 = 2Na_2CrO_4 + H_2O$$

A number of important advantages are obtained by this procedure. Thus it has been found that this method of operating is not only attended with the great advantages that the speed of reaction is considerably increased, but also that the yields become practically quantitative.

A further advantage resides in the fact that in the process according to the invention no foreign substance which has to be separated from the reaction products, need be employed as reaction accelerator. Moreover, the alkaline reacting substances formed during the toluene oxidation, such as caustic alkali, are to be a certain extent neutralized without incurring any cost. The monochromate which is formed from the bichromate employed can be utilized in order to regenerate the chromic hydroxide in known manner. This may, for example, be effected by adding caustic alkali or alkaline earth or alkali or alkaline earth carbonate or magnesia or magnesium carbonate to a mixture of chromic hydroxide and sodium chromate and subjecting the mixture with oxygen, air or other oxygen-containing gases, to pressure oxidation in aqueous phase, for example according to the equation:

$$2Cr_2O_3 + 2Na_2CrO_4 + Na_2CO_3 + 6O =$$
$$3Na_2Cr_2O_7 + CO_2$$

If desired, further sodium chromate may also be added to a mixture for example of chromium hydroxide and sodium chromate and the regeneration effected, for example, according to the equation:

$$2Cr_2O_3 + 4Na_2CrO_4 + 6O = 4Na_2Cr_2O_7$$

The present process can also be executed using for example magnesium bichromate in which case the oxydizing reaction proceeds according to the following formula:

$$2C_6H_5CH_3 + 2MgCr_2O_7 =$$
$$Mg(C_6H_5COO)_2 + 2Cr_2O_3 + MgO + 3H_2O$$
$$MgO + MgCr_2O_7 = 2MgCrO_4$$

The regeneration process is then carried out for example according to the following formula:

$$2Cr_2O_3 + 4MgCrO_4 + 6O = 4MgCr_2O_7$$

It will be seen that the bichromate cycle can in this way be closed in an economical manner.

Example 184 parts of pure toluene are treated with a bichromate solution containing 6 atoms of chromium per molecule of toluene and heated to 250° to 300° C. for about 2–3 hours in a stirring autoclave. After cooling, the chromic oxide-containing residue is separated by filtration and the aqueous solution which contains alkali benzoate and monochromate worked up in a known manner to benzoate and monochromate. The quantity of bichromate introduced is so proportioned that the alkali liberated during the oxidation is neutralized by an equivalent quantity of bichromate with the formation of monochromate.

The chromic oxide-containing residue may be subjected to oxidation and in this way the oxidizing agent regenerated.

What I claim is:

1. In a process for the production of benzoic acid and benzoates by the oxidation of toluene with chromates in the presence of water at temperatures above 100° C. and under superatmospheric pressure, the employment of bichromates for neutralizing the alkaline reacting substances formed during the action of the chromates on toluene.

2. A process according to claim 1, wherein the bichromates are alkali bichromates.

3. A process according to claim 1 wherein the bichromates are alkali earth metal bichromates.

4. A process according to claim 1 wherein the bichromate is magnesium bichromate.

5. In a process for the production of benzoic acid and benzoates by the oxidation of toluene with chromates in the presence of water at temperatures above 100° C. and under superatmospheric pressure, the steps of employing bichromates for neutralizing the alkaline reacting substances formed during the reaction of the chromates on the toluene and regenerating the oxidizing agent by treating the separated chromic oxide-containing residue in the aqueous phase at temperatures above 100° C. and under pressure, with oxidizing gases in the presence of the monochromate formed during the oxidizing process, and substances selected from the group which consists of caustic alkalies and alkaline earths and their carbonates and magnesia and magnesium carbonate.

6. In a process for the production of benzoic acid and benzoates by the oxidation of toluene with chromates in the presence of water at temperatures above 100° C. and under superatmospheric pressure, the steps of employing bichromates for neutralizing the alkaline reacting substances formed during the reaction of the chromates on the toluene and regenerating the oxidizing agent by treating the separated chromic oxide-containing residue in the aqueous phase at temperatures above 100° C. and under pressure, with oxidizing gases in the presence of the monochromates formed during the oxidizing process, together with additional monochromates.

JULES EMILE DEMANT.